(12) United States Patent
Masuda et al.

(10) Patent No.: US 12,467,759 B2
(45) Date of Patent: Nov. 11, 2025

(54) VEHICLE WITH SWITCHABLE FORWARD AND BACKWARD CONFIGURATIONS, CONTROL METHOD, AND CONTROL PROGRAM

(71) Applicant: TOYOTA JIDOSHA KABUSHIKI KAISHA, Toyota (JP)

(72) Inventors: Taizo Masuda, Yokohama (JP); Kiyoto Sasaki, Susono (JP); Daisuke Kakuma, Toyota (JP); Hiroyoshi Masui, Susono (JP); Akihiro Yamaguchi, Toyota (JP); Sokfan Yee, Toyota (JP); Yuki Nishikawa, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 18/361,334

(22) Filed: Jul. 28, 2023

(65) Prior Publication Data

US 2024/0068827 A1 Feb. 29, 2024

(30) Foreign Application Priority Data

Aug. 26, 2022 (JP) ................................ 2022-135385

(51) Int. Cl.
*G01C 21/34* (2006.01)
*G01C 21/00* (2006.01)
(Continued)

(52) U.S. Cl.
CPC ..... *G01C 21/3484* (2013.01); *G01C 21/3476* (2013.01); *G01C 21/3811* (2020.08);
(Continued)

(58) Field of Classification Search
CPC ............ G01C 21/3484; G01C 21/1656; G01C 21/26; G06Q 50/14; G05D 1/021;
(Continued)

(56) References Cited

U.S. PATENT DOCUMENTS

2017/0227368 A1* 8/2017 Bryson ................ G05D 1/0291
2020/0256694 A1 8/2020 Ueda et al.
2021/0380134 A1* 12/2021 Kanitz ................... G06Q 10/02

FOREIGN PATENT DOCUMENTS

| JP | 2011180100 A | * | 9/2011 | |
| JP | 2020-134953 A | | 8/2020 | |
| KR | 101701232 B1 | * | 2/2017 | ......... G07C 9/00126 |

* cited by examiner

*Primary Examiner* — Truc M Do
*Assistant Examiner* — Noah W Stiebritz (57) ABSTRACT

A vehicle according to the present disclosure includes a first riding space and a second riding space, each of which is a riding position on one side and the other side of a right side and a left side with respect to a front-rear direction, respectively, and is configured to: acquire a traveling route; identify a side where a landscape viewed from the vehicle is good from among the right side and the left side with respect to a traveling direction; identify a preferential space in which a degree of preferential treatment of a passenger riding in the first riding space or the second riding space is high; and determine the forward direction and the backward direction when the vehicle travels on the traveling route such that the preferential space is set to the side where the landscape viewed from the vehicle is good.

7 Claims, 7 Drawing Sheets

(51) Int. Cl.
*G06Q 50/14* (2012.01)
*G05D 105/22* (2024.01)
*G05D 109/10* (2024.01)

(52) U.S. Cl.
CPC ......... *G06Q 50/14* (2013.01); *G05D 2105/22* (2024.01); *G05D 2109/10* (2024.01)

(58) Field of Classification Search
CPC ............. G05D 1/0274; G05D 2109/10; G05D 2105/20; B60W 2420/403
See application file for complete search history.

FIG. 1A

ANTEROPOSTERIOR DIRECTION

FIG. 1B

ANTEROPOSTERIOR DIRECTION

VEHICLE WITH SWITCHABLE FORWARD AND BACKWARD CONFIGURATIONS, CONTROL METHOD, AND CONTROL PROGRAM

CROSS-REFERENCE TO RELATED APPLICATION

This application claims priority to Japanese Patent Application No. 2022-135385 filed on Aug. 26, 2022, incorporated herein by reference in its entirety.

BACKGROUND

1. Technical Field

The present disclosure relates to a vehicle that travels according to a traveling route.

2. Description of Related Art

Japanese Unexamined Patent Application Publication No. 2020-134953 (JP 2020-134953 A) discloses an information processing device including a control unit that executes identifying a facility corresponding to a user attribute including a user's needs, preferences, or characteristics, and outputting information on a facility that has not been visited from the identified facility to the user.

SUMMARY

By applying a technique disclosed in JP 2020-134953 A to a vehicle, it is possible to output, to a user, information on a destination (facility) of the vehicle according to a request or an attribute of the user.

By the way, in a case where a scenic spot is located around a traveling route up to the destination, for example, a passenger riding in the vehicle may wish to enjoy a landscape outside the vehicle while the vehicle is traveling on the traveling route. However, in a vehicle in which a plurality of passengers rides such as a tourist bus, it is assumed that each passenger may not be able to enjoy the landscape well depending on a riding position. On the other hand, depending on a situation of the passenger, some passengers may wish to be given preferential treatment such that they can enjoy the landscape well.

In view of the above issues, one object of the present disclosure is to provide a technique that enables the preferential passengers to enjoy the landscape better while the vehicle is traveling on the traveling route.

A first aspect of the present disclosure relates to a vehicle configured to be able to switch between a forward direction and a backward direction.

The vehicle according to the first aspect includes a first riding space and a second riding space, each of which is a riding position on one side and the other side of a right side and a left side with respect to a front-rear direction, respectively, in which the vehicle is configured to: acquire a traveling route; identify a side where a landscape viewed from the vehicle is good from among the right side and the left side with respect to a traveling direction for the traveling route; identify, based on attribute information of each of a passenger riding in the first riding space and a passenger riding in the second riding space, a preferential space in which a degree of preferential treatment of the passenger riding in the first riding space or the second riding space is high; and determine the forward direction and the backward direction when the vehicle travels on the traveling route such that the preferential space is set to the side where the landscape viewed from the vehicle is good.

A second aspect of the present disclosure relates to a control method for causing a computer to execute control of a vehicle configured to be able to switch between a forward direction and a backward direction. Here, the vehicle includes a first riding space and a second riding space, each of which is a riding position on one side and the other side of a right side and a left side with respect to a front-rear direction, respectively.

The control method according to the second aspect includes:
acquiring a traveling route;
identifying a side where a landscape viewed from the vehicle is good from among the right side and the left side with respect to a traveling direction for the traveling route;
identifying, based on attribute information of each of a passenger riding in the first riding space and a passenger riding in the second riding space, a preferential space in which a degree of preferential treatment of the passenger riding in the first riding space or the second riding space is high; and
determining the forward direction and the backward direction when the vehicle travels on the traveling route such that the preferential space is set to the side where the landscape viewed from the vehicle is good.

A third aspect of the present disclosure relates to a control program for causing a computer to execute control of a vehicle configured to be able to switch between a forward direction and a backward direction. Here, the vehicle includes a first riding space and a second riding space, each of which is a riding position on one side and the other side of a right side and a left side with respect to a front-rear direction, respectively.

The control program according to the third disclosure is configured to cause the computer to execute processes including:
acquiring a traveling route;
identifying a side where a landscape viewed from the vehicle is good from among the right side and the left side with respect to a traveling direction for the traveling route;
identifying, based on attribute information of each of a passenger riding in the first riding space and a passenger riding in the second riding space, a preferential space in which a degree of preferential treatment of the passenger riding in the first riding space or the second riding space is high; and
determining the forward direction and the backward direction when the vehicle travels on the traveling route such that the preferential space is set to the side where the landscape viewed from the vehicle is good.

According to the present disclosure, the vehicle is configured to be able to switch between the forward direction and the backward direction, and has a first riding space and a second riding space, each of which is a riding position on one side and the other side of the right side and the left side with respect to the front-rear direction, respectively. In addition, according to the present disclosure, the side where the landscape viewed from the vehicle is good for the traveling route and the preferential space in which the degree of preferential treatment of the passenger riding in the first riding space or the second riding space is high are identified. Then, the forward direction and the backward direction of the vehicle are determined such that the preferential space is set to the side where the landscape viewed from the vehicle is good. As a result, the passenger with the high degree of preferential treatment can enjoy the landscape better while the vehicle is traveling on the traveling route.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present embodiment will be described with reference to the drawings.

1. Overview

Figure 1A:
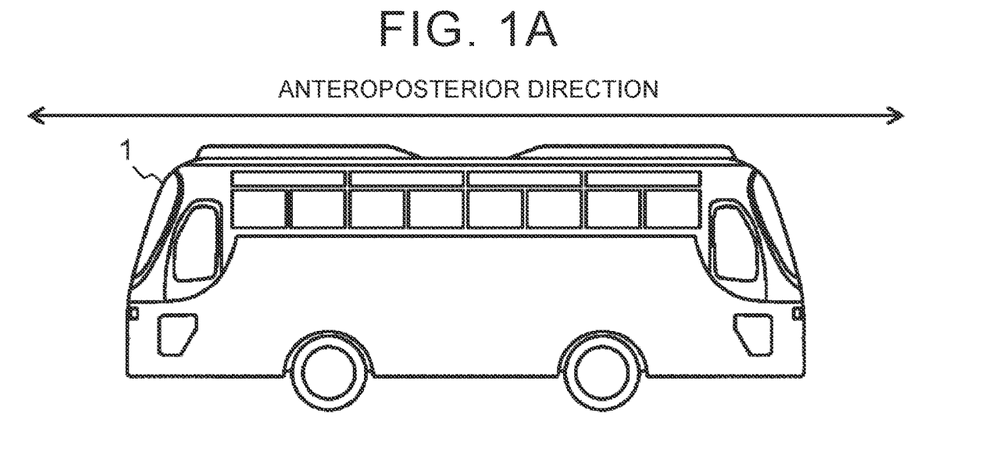
FIG. 1A is a schematic view illustrating an appearance of a vehicle according to an embodiment of the present disclosure.
Figure 1B:
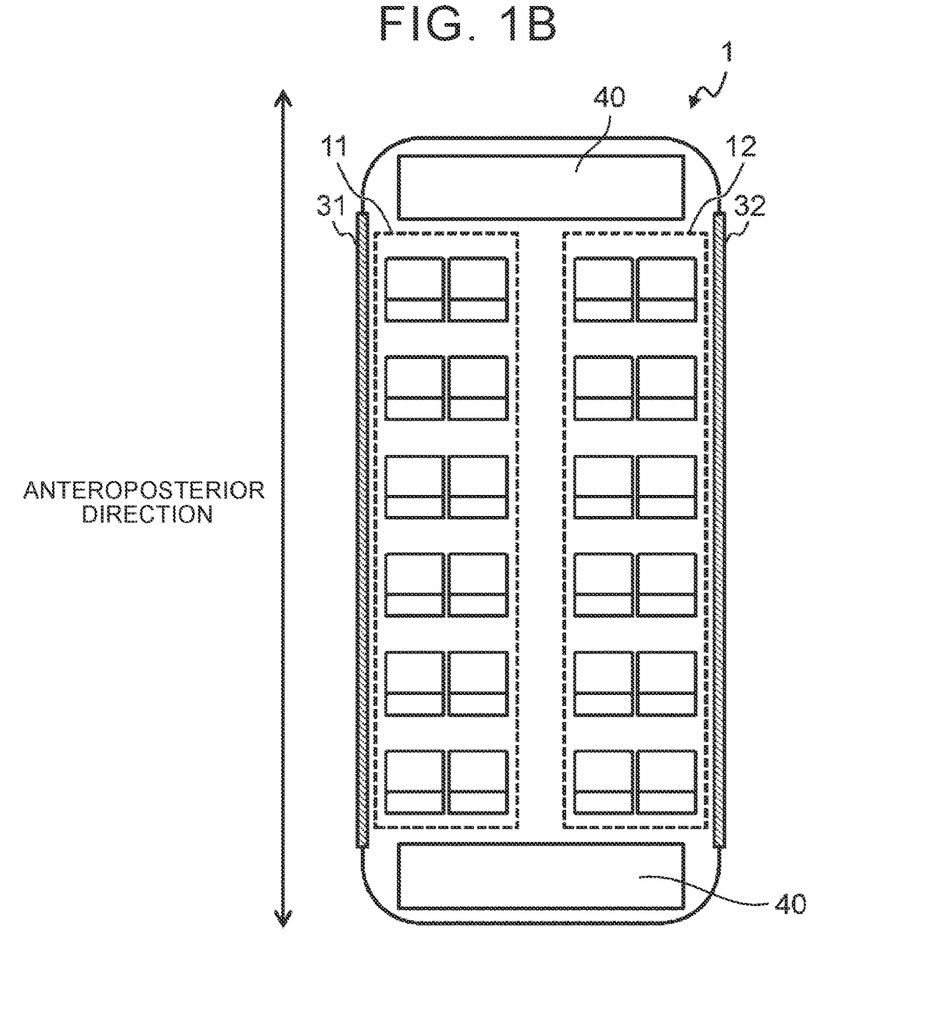
FIG. 1B is a schematic diagram illustrating a layout inside a vehicle according to an embodiment of the present disclosure.

FIGS. 1A and 1B are conceptual diagrams illustrating an overview of the vehicles 1 according to the present embodiment. In particular, FIG. 1A shows the appearance of the vehicles 1. FIG. 1B shows the layout inside the vehicle 1.

The vehicle 1 includes a first riding space 11 and a second riding space 12, which serve as a riding position of the passenger, and a crew member space 40, which serves as a riding position of the crew member. As shown in FIG. 1B, the vehicle 1 has a first riding space 11 and a second riding space 12 on one side and the other side with respect to the front-rear direction.

In FIG. 1B, the seats are arranged in the first riding space 11 and the second riding space 12. That is, the passengers riding on the vehicles 1 shown in FIGS. 1A and 1B are seated in the seats arranged in the first riding space 11 or the second riding space 12. However, the vehicle 1 according to the present embodiment may be configured such that a passenger can ride on the first riding space 11 or the second riding space 12. For example, the first riding space 11 and the second riding space 12 may have, in part, a standing space in which no seats are arranged. Alternatively, all of the first riding space 11 and the second riding space 12 may be a standing space.

Further, the vehicle 1 has a first vehicle window portion 31 and a second vehicle window portion 32, which allow the passenger to view the outside of the vehicle 1, on the side of the first riding space 11 and the side of the second riding space 12, respectively. That is, it is assumed that the passenger riding in the first riding space 11 mainly views the outside of the vehicle 1 from the first vehicle window portion 31, and the passenger riding in the second riding space 12 mainly views the outside of the vehicle 1 from the second vehicle window portion 32.

The vehicle 1 according to the present embodiment travels according to a travel route to be generated or acquired. Typically, the vehicle 1 is an autonomous vehicle. In this case, the vehicle 1 performs travel control so as to travel in accordance with a travel route to be generated or acquired. However, the vehicle 1 may be a vehicle that is operated by a crew member. For example, a driving device (pedal, steering, etc.) for a crew member to drive the vehicle 1 may be disposed in the crew member space 40. In this case, the crew member drives the vehicle 1 so as to travel in accordance with the travel route generated or acquired by the vehicle 1.

Figure 2:
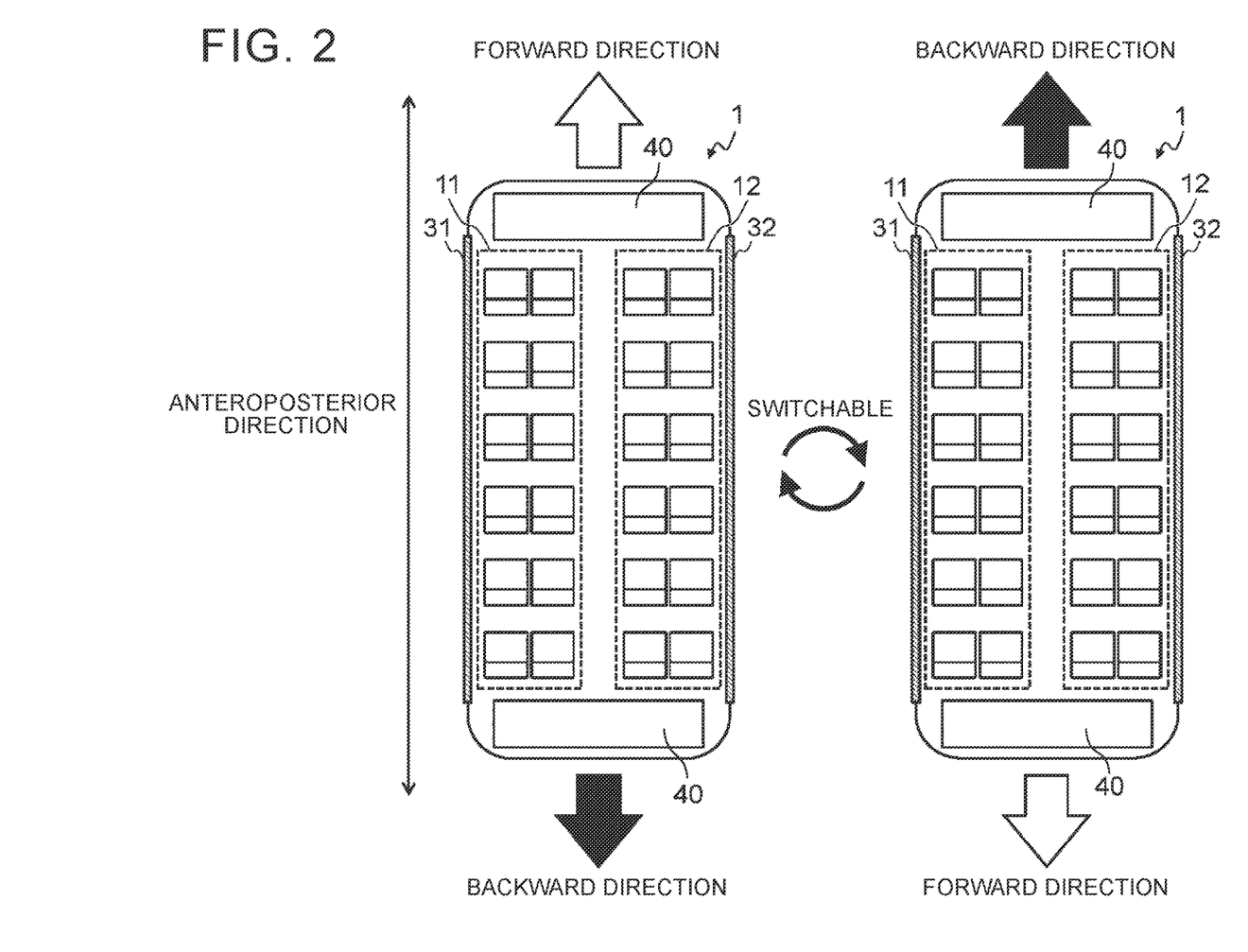
FIG. 2 is a conceptual diagram for explaining switching between a forward direction and a backward direction in the vehicle according to the present embodiment.

The vehicle 1 according to the present embodiment is further configured to be able to switch between the forward direction and the backward direction. FIG. 2 is a conceptual diagram illustrating switching between a forward direction and a backward direction in the vehicle 1. FIG. 2 shows two patterns in which the forward direction and the backward direction are mutually switched with respect to the vehicle 1. In the pattern on the left side of the drawing, the first riding space 11 is on the left side with respect to the forward direction of the vehicle 1, and the second riding space 12 is on the right side with respect to the forward direction of the vehicle 1. On the other hand, in the pattern on the left side of the drawing, the second riding space 12 is on the left side with respect to the forward direction of the vehicle 1, and the first riding space 11 is on the right side with respect to the forward direction of the vehicle 1. As described above, when the forward direction and the backward direction of the vehicle 1 are switched, the left and right sides of the first riding space 11 and the second riding space 12 with respect to the forward direction are switched.

It should be noted that a suitable configuration may be adopted as a configuration in which the forward direction and the backward direction can be switched to each other. For example, the vehicle 1 is configured such that the power transmission mechanism, the steering mechanism, and the brake mechanism are symmetrical with respect to the front-rear direction. Further, for example, the vehicle 1 is configured to separately include a power transmission mechanism, a steering mechanism, and a brake mechanism corresponding to each of the two patterns in the forward direction and the backward direction.

In the vehicle 1 according to the present embodiment, the switching between the forward direction and the backward direction is controlled by the control device. That is, the forward direction and the backward direction of the vehicle 1 are determined by the control device. Typically, the control device is provided in the vehicle 1. However, the control device may be an external device of the vehicle 1, and may control the vehicle 1 by communication. Hereinafter, a control method for switching between the forward direction and the backward direction of the vehicle 1 by the control device will be described.

First, the control device specifies, with respect to the traveling route of the vehicle 1, a side on which the landscape viewed from the vehicle 1 is good among the left side and the right side with respect to the traveling direction. Here, the control device can specify a side having a good landscape viewed from the vehicle 1 from a scenic spot located in the vicinity of the traveling route.

Figure 3A:
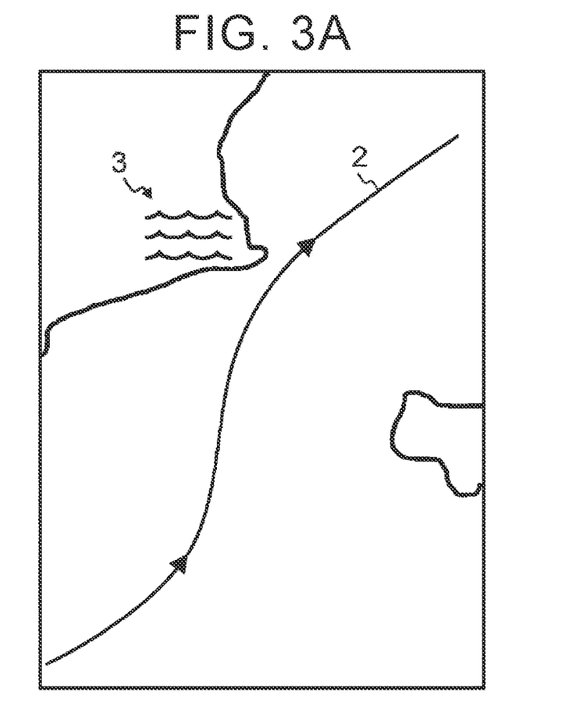
FIG. 3A is a schematic diagram for explaining a side in which a view from a vehicle is good.
Figure 3B:
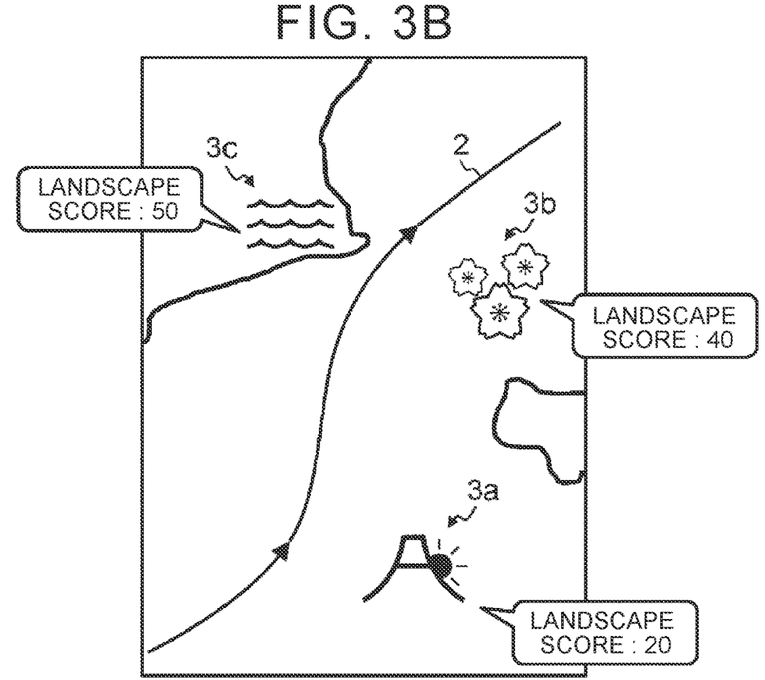
FIG. 3B is a schematic diagram for explaining a side in which a view from a vehicle is good.

Referring FIGS. 3A and 3B, a better view viewed from the vehicles 1 will be described. Two exemplary diagrams, FIGS. 3A and 3B, are shown for a certain area around the traveling route 2 and the traveling route 2. In FIGS. 3A and 3B, the traveling direction is a direction indicated by an arrow of the traveling route 2.

In FIG. 3A, there is only one scenic spot 3 located in the vicinity of the traveling route 2. In this case, the control device may specify the side where the scenic spot 3 is located with respect to the traveling direction as the side where the landscape viewed from the vehicle 1 is good. In FIG. 3A, the left side with respect to the traveling direction is identified as a side where the landscape viewed from the vehicle 1 is good.

In FIG. 3B, there are a plurality of scenic spots 3 located in the vicinity of the traveling route 2. In FIG. 3B, three scenic spots 3a, 3b and 3c are located in the vicinity of the traveling route 2. In this case, the control device acquires a landscape score indicating the quality of the landscape for each of the plurality of scenic spots 3 located in the vicinity of the traveling route 2. In the illustrated 3B, the scenic spots 3a, 3b and the landscape scores of 3c are 20, 40, and 50.

Then, the control device identifies a side on which the landscape viewed from the vehicle 1 is good by comparing the landscape score of the scenic spot 3 located on the left side with respect to the traveling direction and the landscape score of the scenic spot 3 located on the right side with respect to the traveling direction. For example, it is assumed that one of the control devices has a large sum of the landscape scores is a side where the landscape viewed from the vehicle 1 is good. In this case, in FIG. 3B, the control device is configured such that the right side of the traveling direction is a side where the view viewed from the vehicle 1 is good. Further, for example, the control device may set the scenic spot 3 having the highest landscape score to be located on the side where the landscape viewed from the vehicle 1 is good. In this case, in FIG. 3B, the control device is configured such that the left side of the traveling direction is a side where the landscape viewed from the vehicle 1 is good.

The landscape score may be a value managed in advance for each of the plurality of scenic spots 3. For example, the landscape score for each of the plurality of scenic spots 3 is managed as a database. In particular, the database may be configured to manage the landscape score according to the time and the time for the scenic spot 3 in which the landscape differs depending on the time and the time. In this case, the control device acquires the landscape score according to the time and the timing. Further, the database may be configured to manage landscape scores according to the attributes of the passengers. For example, the database may be configured to manage different landscape scores for each scenic spot 3 depending on age group, gender, or whether or not the user is a foreigner. In this case, the control device acquires the landscape score for each passenger riding on the scenic spot 3, and sets the total of the acquired landscape scores as the landscape score of the scenic spot 3. Further, the control device may be configured to correct the landscape score according to the positional relationship between the traveling route 2 and the scenic spot 3. For example, the control device may be configured to reduce the landscape score as the distance from the traveling route 2 increases.

Next, the control device identifies one of the first riding space 11 and the second riding space 12 that has a high degree of preferential treatment (hereinafter, also referred to as "preferential treatment space") on the basis of the attribute information of each of the passengers riding in the first riding space 11 and the passengers riding in the second riding space 12. Here, the passenger to be ridden may be a passenger actually ridden on the vehicle 1. The passenger to be boarded may be a passenger who is to be boarded when the vehicle 1 travels on the traveling route 2.

The control device can give the degree of preference of the passenger riding on the vehicle, for example, as follows.

One example is to use the number of passengers as an index in the attribute information. The control device can set a higher degree of preferential treatment as the number of passengers increases for each of the passengers in the first riding space 11 and the passengers in the second riding space 12. By giving the degree of preferential treatment in this way, it is possible to make it easier for a passenger to get rid of many passengers while being identified as a preferential space.

Another example is to use the past passenger ride status as an index in the attribute information. For each of the passengers riding in the first riding space 11 and the passengers riding in the second riding space 12, the control device can increase the degree of preferential treatment as the number of passengers who have ridden in the preferential treatment space specified in the travel route equivalent to the traveling route 2 in the past decreases. By giving the degree of preferential treatment as described above, it is possible to make it easier for a large number of passengers who are to view the scenic spot 3 located in the vicinity of the traveling route 2 for the first time to get ride, while being easily identified as the preferential treatment space.

Another example is to use the age of the passenger as an index in the attribute information. The control device can set the degree of preferential treatment to be higher as the number of children increases for each of the passengers riding in the first riding space 11 and the passengers riding in the second riding space 12. Here, the control device may be configured to consider a passenger having a predetermined age or less (for example, 12 years or less) as a child. By giving such a degree of preferential treatment, it is possible to make it easier for a large number of children to get on a vehicle while being identified as a preferential treatment space.

Another example is to use the paid riding fee as an index in the attribute information. The control device can set a higher degree of preferential treatment for each of the passengers riding in the first riding space 11 and the passengers riding in the second riding space 12 as the total of the paid riding fees increases. By giving such a degree of preferential treatment, it is possible to make it easier for many passengers who have paid a high ride fee to get ride while being identified as a preferential space.

In this way, the control device can give the degree of preference to the passengers riding on the vehicle. However, the control device may be configured to identify the preferential space from the one index. The control device may be configured to identify a preferential space from a combination of a plurality of indices.

Figure 4A:
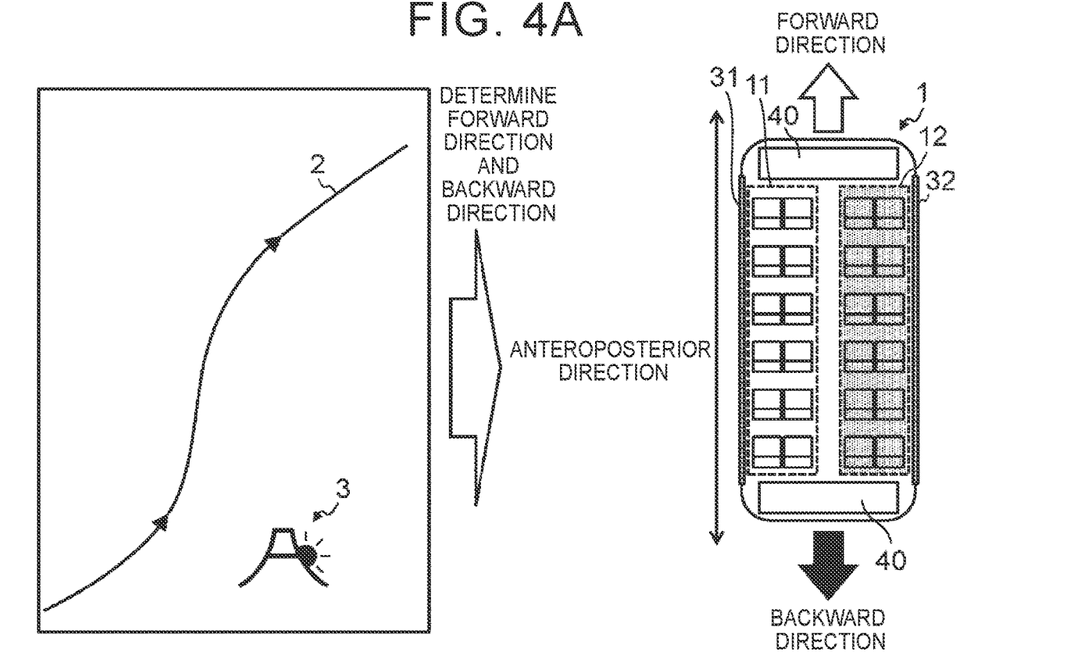
FIG. 4A is a schematic diagram illustrating an example of a forward direction and a backward direction of a vehicle determined when a second riding space is specified as a preferential space.
Figure 4B:
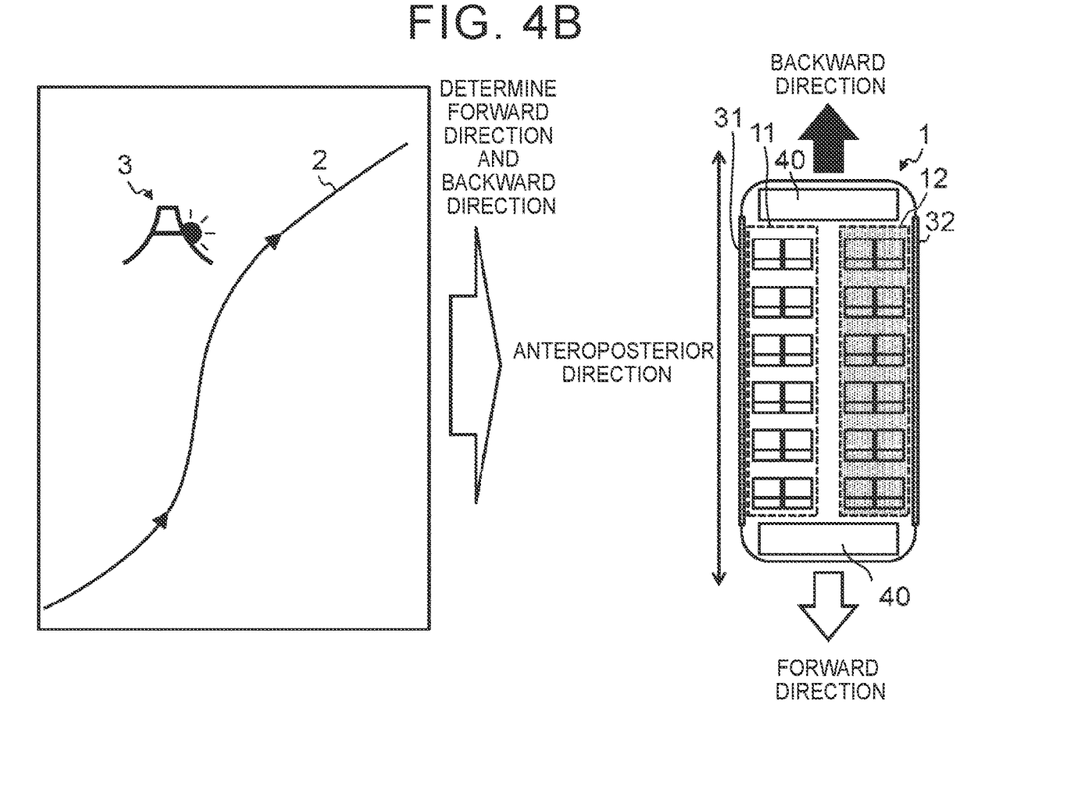
FIG. 4B is a schematic diagram illustrating an example of a forward direction and a backward direction of a vehicle determined when a second riding space is specified as a preferential space.

Next, the control device determines the forward direction and the backward direction when the vehicle 1 travels on the traveling route 2 so that the preferential space is on the side where the landscape viewed from the vehicle 1 is good. FIGS. 4A and 4B show examples of the forward direction and the backward direction of the vehicle 1 determined by the control device. For cases where the second riding space 12 is identified as a preferential space, two patterns are shown in FIGS. 4A and 4B.

In FIG. 4A, the scenic spot 3 located around the traveling route 2 is located on the right side with respect to the traveling direction. The right side with respect to the traveling direction is identified as a side where the landscape viewed from the vehicle 1 is good. As shown in FIG. 4A, the control device determines the forward direction and the backward direction of the vehicle 1 so that the second riding space 12 (preferential space) is on the right side with respect to the traveling direction.

In FIG. 4B, the scenic spot 3 located in the vicinity of the traveling route 2 is located on the left side with respect to the traveling direction. The left side with respect to the traveling direction is identified as a side where the landscape viewed from the vehicle 1 is good. In this instance, as shown in FIG. 4B, the control device determines the forward direction and the backward direction of the vehicle 1 such that the second riding space 12 (preferential space) is on the left side with respect to the traveling direction.

In both FIGS. 4A and 4B, the passenger riding in the second riding space 12 (preferential space) can enjoy the landscape more when the vehicle 1 travels on the traveling route 2. Note that the vehicle 1 may be configured such that the seat is rotated in accordance with the forward direction and the backward direction. For example, the vehicle 1 is configured such that the seat is rotated such that the direction of the passenger is the forward direction of the vehicle 1.

As described above, the vehicle 1 according to the present embodiment is configured to travel in accordance with a travel route and to be able to switch between a forward direction and a backward direction. Further, according to the vehicle 1 according to the present embodiment, a side where the traveling route is viewed from the vehicle 1 and a preferential treatment space where the preferential treatment degree of the passenger riding in the first riding space and the second riding space is high are specified. Then, the forward direction and the backward direction of the vehicle 1 are determined so that the preferential space is the side where the landscape viewed from the vehicle 1 is good. As a result, the passenger who has a high degree of preferential treatment can enjoy the landscape better while the vehicle 1 is traveling on the traveling route.

The control device may be configured to divide the travel route up to the destination into a plurality of travel routes, and determine the forward direction and the backward direction for each of the plurality of divided travel routes. In this case, it is assumed that the forward direction and the backward direction of the vehicle 1 are switched while traveling on a traveling route up to the destination. With such a configuration, even in a case where a good side of the landscape viewed from the vehicle 1 is changed in the middle of the traveling route up to the destination, it is possible to better enjoy the landscape for the passenger who has a high degree of preferential treatment.

In addition, the vehicle 1 may be configured so as to be able to show an image of a side where the landscape viewed from the vehicle 1 is good to a passenger who rides in the other passenger space which is not a preferential space. For example, the vehicle 1 is configured to include a camera that captures images of the left and right scenery of the vehicle 1, and a display device that captures images captured by the camera.

2. Configuration

Hereinafter, a configuration of a vehicle 1 according to the present embodiment will be described with reference to the drawings. In the following description, it is assumed that the vehicle 1 is an autonomous vehicle.

Figure 5:
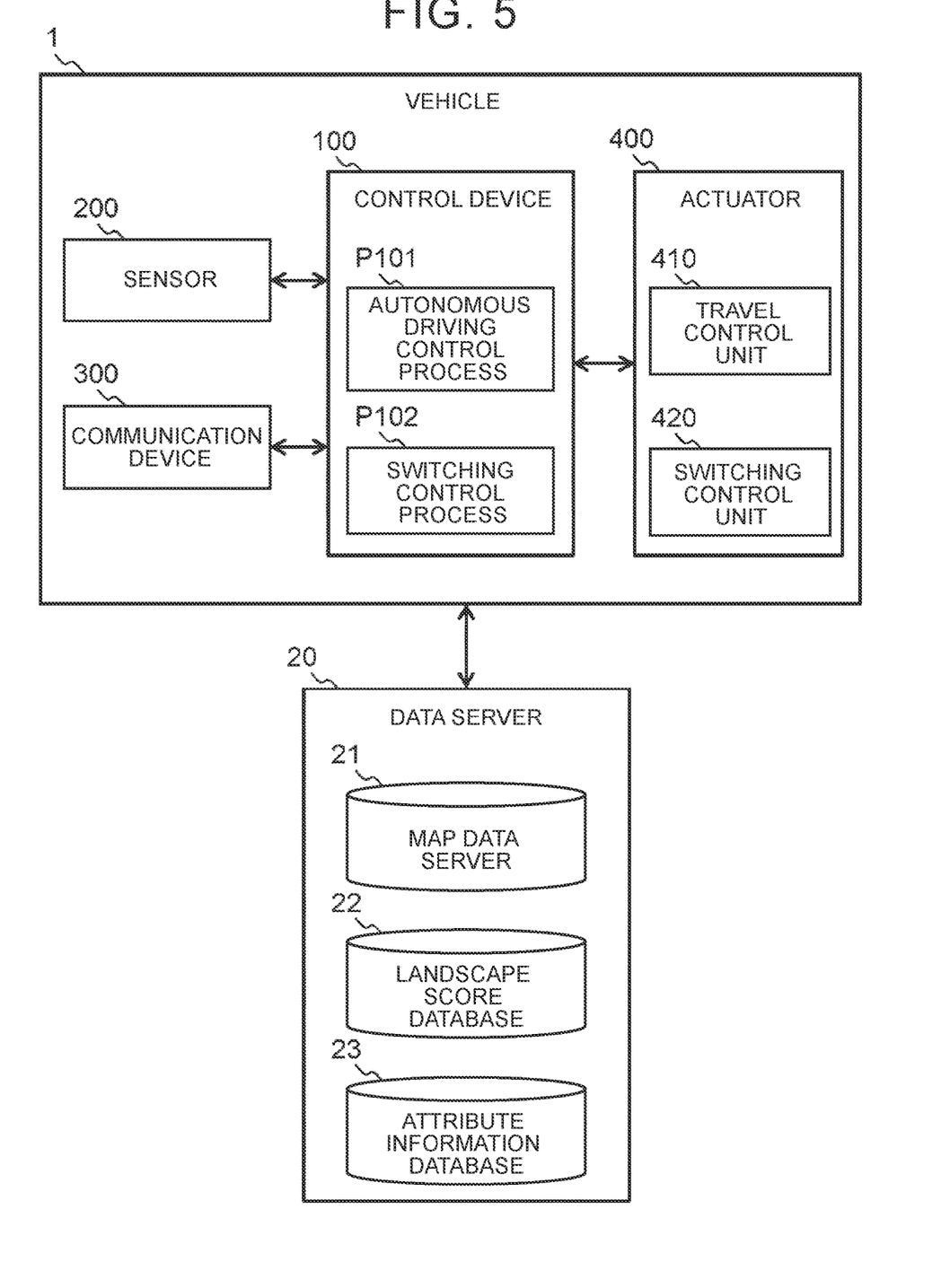
FIG. 5 is a block diagram illustrating a configuration of a vehicle according to the present embodiment.

FIG. 5 is a block diagram illustrating a configuration of the vehicle 1 according to the present embodiment. The vehicle 1 includes a control device 100, a sensor 200, a communication device 300, and an actuator 400.

The sensor 200 detects a driving environment of the vehicle 1. For example, the sensor 200 includes a sensor that detects the surrounding environment of the vehicle 1 (a preceding vehicle, a white line, an obstacle, and the like), and a sensor that detects the traveling state (vehicle speed, acceleration, yaw rate, and the like) of the vehicle 1. Examples of the sensor for detecting the surroundings of the vehicles 1 include cameras, millimeter-wave radars, and LiDAR. Examples of the sensor for detecting the traveling state of the vehicle 1 include a wheel speed sensor, a G sensor, and a gyro sensor. Information detected by the sensor 200 is transmitted to the control device 100.

The communication device 300 communicates with a device outside the vehicle 1 to transmit and receive information. In particular, the communication device 300 includes a device that communicates with the data server 20. Here, the data server 20 is typically a computer accessible via the Internet. The data server 20 stores a map database 21, a landscape score database 22, and an attribute information database 23. The map database 21 manages map information. The map information managed by the map database 21 includes at least information on the position of the scenic spot 3 on the map. The landscape score database 22 manages the landscape scores for each of the plurality of scenic spots 3. The attribute information database 23 manages attribute information of a passenger riding on the vehicle 1.

Information received by the communication device 300 is transmitted to the control device 100. In other words, the communication device 300 enables the control device 100 to be connected to the map database 21, the landscape score database 22, and the attribute information database 23.

The control device 100 executes various processes based on the information to be acquired. Typically, the control device 100 is a computer connected to an in-vehicle network. The control device 100 is configured to execute an autonomous driving control process P101 and a switching control process P102.

The autonomous driving control process P101 is processing related to an autonomous driving function. The autonomous driving control process P101 includes at least a processing for generating a traveling route 2 of the vehicle 1 and a processing for generating a control signal for causing the vehicle 1 to travel in accordance with the generated traveling route 2. The control signal generated by executing the autonomous driving control process P101 is transmitted to the actuator 400.

The switching control process P102 is processing related to switching between the forward direction and the backward direction of the vehicle 1. By executing the switching control process P102, the forward direction and the backward direction of the vehicle 1 are determined, and a control signal for switching between the determined forward direction and the backward direction is generated. The control signal generated by executing the switching control process P102 is transmitted to the actuator 400.

The actuator 400 operates in accordance with a control signal transmitted from the control device 100. The actuator 400 includes a travel control unit 410 and a switching control unit 420.

The travel control unit 410 is an actuator related to travel control of the vehicle 1. Examples of the travel control unit 410 include actuators related to the operation of a power device (an internal combustion engine, an electric motor, or the like), actuators related to the operation of a brake mechanism, and actuators related to the operation of a steering mechanism. The travel control unit 410 operates in accordance with a control signal generated by executing the autonomous driving control process P101, thereby realizing autonomous driving of the vehicle 1.

The switching control unit 420 is an actuator for switching between the forward direction and the backward direction of the vehicle 1. Examples of the switching control unit 420 include an actuator that switches a transmission direction of power, an actuator that switches a mechanism to be operated, and the like. The switching control unit 420 operates in accordance with a control signal generated by executing the switching control process P102, so that switching between the forward direction and the backward direction of the vehicle 1 is realized.

Figure 6:
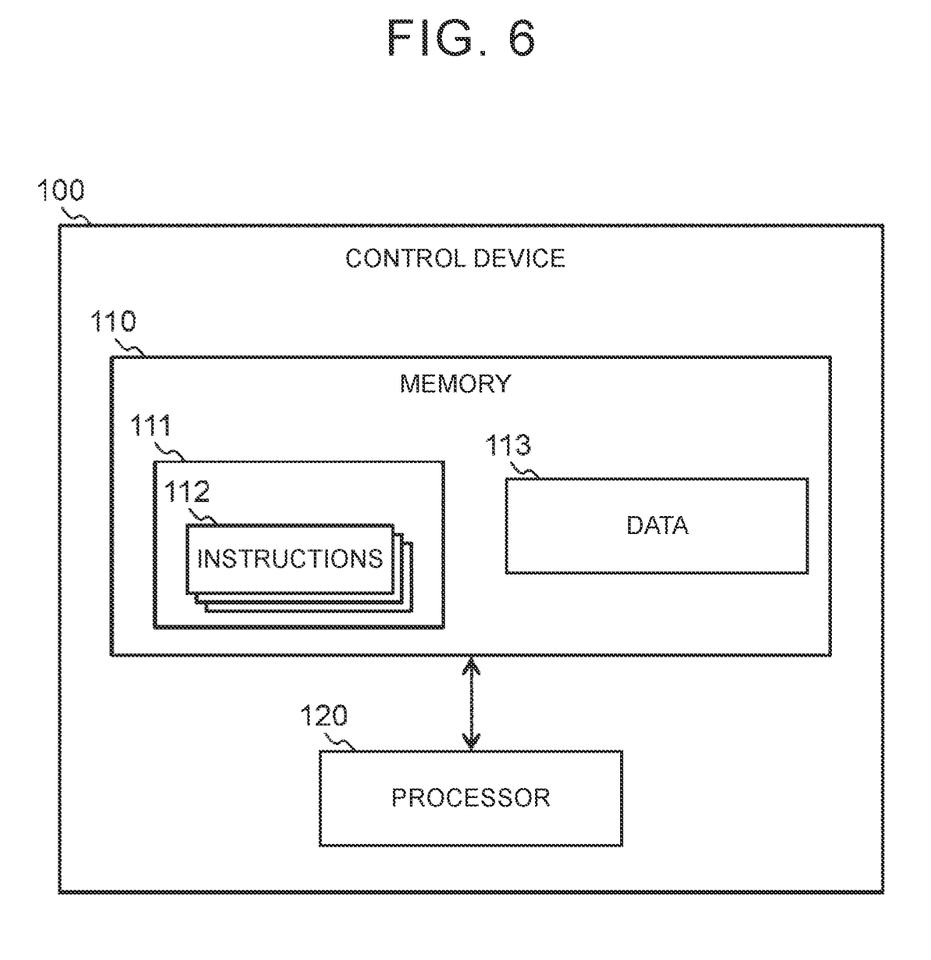
FIG. 6 is a block-diagram showing the configuration of the control device shown in FIG. 5.

FIG. 6 is a block diagram illustrating a configuration of the control device 100. The control device 100 includes a memory 110 and a processor 120.

The memory 110 is coupled to the processor 120. The memory 110 stores a plurality of instructions 112 executable by the processor 120 and various kinds of data 113 necessary for executing processing. Here, the plurality of instructions 112 is given by a computer program 111 (control program). Examples of the various types of data 113 include information detected by the sensor 200, information related to the map database 21 and the landscape score database 22 received by the communication device 300, and information on the travel route generated by executing the autonomous driving control process P101.

The instructions 112 are configured to cause the processor 120 to execute an autonomous driving control process P101 and a switching control process P102. That is, the autonomous driving control processing P101 and the switching control processing P102 are executed by the processor 120 operating in accordance with the plurality of instructions 112.

As described above, the vehicle 1 according to the present embodiment can be configured. The vehicle 1 according to the present embodiment may be configured to hold the map database 21, the landscape score database 22, or the attribute information database 23 as data 113 stored in the memory 110 of the control device 100.

3. Switching Control Process

Hereinafter, a switching control process P102 executed by the control device 100 will be described.

Figure 7:
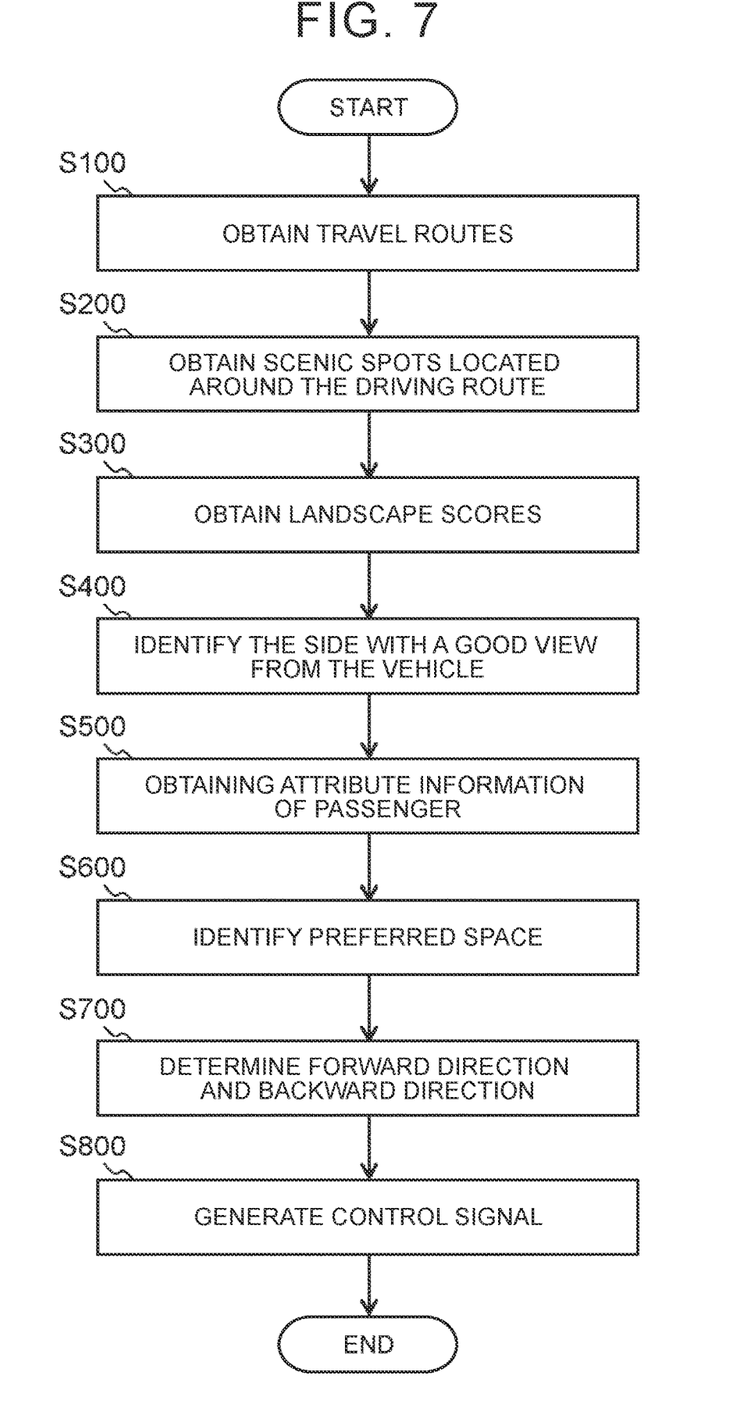
FIG. 7 is a flowchart illustrating an example of a process related to switching between a forward direction and a backward direction of a vehicle.

FIG. 7 is a flow chart illustrating an exemplary switching control process P102. The flow chart shown in FIG. 7 is started, for example, when the traveling route 2 is generated by executing the autonomous driving control process P101.

In S100, the control device 100 acquires the traveling route 2 generated by executing the autonomous driving control process P101. After S100, the process proceeds to S200.

In S200, the control device 100 is connected to the map database 21, and acquires the scenic spot 3 located in a certain area around the traveling route 2 acquired in S100. After S200, the process proceeds to S300.

In S300, the control device 100 connects to the landscape score database 22 and acquires the landscape score of the scenic spot 3 acquired in S200. After S300, the process proceeds to S400. If there is only one scenic spot 3 acquired in S200, the control device 100 may skip S300.

In S400, the control device 100 compares the landscape score of the scenic spot 3 located on the left side with respect to the traveling direction of the traveling route 2 with the landscape score of the scenic spot 3 located on the right side with respect to the traveling direction, and identifies the side where the landscape viewed from the vehicle 1 is good. After S400, the process proceeds to S500. When the number of scenic spots 3 acquired in S200 is one, the control device 100 may be configured such that the side where the scenic spot 3 is located with respect to the traveling direction of the traveling route 2 is a side where the landscape viewed from the vehicles 1 is a good side by S400.

In S500, the control device 100 connects to the attribute information database 23 and acquires attribute information of a passenger riding on the vehicle 1. After S400, the process proceeds to S500.

In S600, the control device 100 identifies a favorable treatment space in which the favorable treatment degree of the passenger is higher among the first riding space 11 and the second riding space 12 based on the attribution information acquired in S500. After S600, the process proceeds to S700.

In S700, the control device 100 determines the forward direction and the backward direction of the vehicle 1 so that the preferential space specified in S600 becomes the good side of the landscape viewed from the vehicle 1 specified in S400. After S700, the process proceeds to S800.

In S800, the control device 100 generates a control signal so as to be in the forward direction and the backward direction determined in S700. After S800, the process ends. When the forward direction and the backward direction determined in S700 coincide with the present forward direction and the backward direction of the vehicle 1, the control device 100 may skip S800.

In this way, the control device 100 executes the switching control process P102. In this manner, a control method of switching between the forward direction and the backward direction of the vehicle 1 is realized by the control device 100.

What is claimed is:

1. A vehicle configured to be able to switch between a forward direction and a backward direction, the vehicle comprising:
    a first riding space and a second riding space, each of which is a riding position on one side and the other side of a right side and a left side with respect to a front-rear direction of the vehicle, respectively, wherein the vehicle is configured to:
    acquire a traveling route;
    identify a side where a landscape viewed from the vehicle is good from among the right side and the left side with respect to a traveling direction for the traveling route;
    identify, based on attribute information of each of a passenger riding in the first riding space and a passenger riding in the second riding space, a preferential space in which a degree of preferential treatment of the first riding space or the second riding space is high, wherein the attribute information includes a past riding status of each passenger as to whether each passenger has ridden the vehicle in the preferential space before in a travel route equivalent to the traveling route, and the vehicle determines a number of passengers on each of the first riding space and the second riding space who have not ridden the vehicle in the preferential space before, and the preferential space is identified to be either the first riding space or the second riding space that has a higher degree of preferential treatment, and the degree of preferential treatment of respective space increases as the number of passengers who have not ridden the vehicle in the preferential space before is high on the respective space;

configure an orientation of the vehicle to be either the forward direction or the backward direction so that, when the vehicle travels on the traveling route, the preferential space is set to the side where the landscape viewed from the vehicle is good; and control the vehicle to travel the traveling route with the configured orientation.

2. The vehicle according to claim 1, wherein identifying the side where the landscape viewed from the vehicle is good includes:

acquiring a landscape score indicating a quality of the landscape for each of one or more scenic spots located in a predetermined area around the traveling route; and identifying the side where the landscape viewed from the vehicle is good by comparing the landscape score of a scenic spot located on the left side of the one or more scenic spots with the landscape score of a scenic spot located on the right side of the one or more scenic spots.

3. The vehicle according to claim 1, wherein:

the attribute information includes age information; and identifying the preferential space includes setting the degree of preferential treatment of the respective space to be high as a number of children is large on the respective space.

4. The vehicle according to claim 1, wherein:

the attribute information includes information of a paid riding fee; and identifying the preferential space includes setting the degree of preferential treatment of the respective space to be high as a total of the paid riding fee is high on the respective space.

5. A control method for causing a computer to execute control of a vehicle that is configured to be able to switch between a forward direction and a backward direction and that includes a first riding space and a second riding space, each of which is a riding position on one side and the other side of a right side and a left side with respect to a front-rear direction of the vehicle, respectively, the control method comprising:

acquiring a traveling route;

identifying a side where a landscape viewed from the vehicle is good from among the right side and the left side with respect to a traveling direction for the traveling route;

identifying, based on attribute information of each of a passenger riding in the first riding space and a passenger riding in the second riding space, a preferential space in which a degree of preferential treatment of the first riding space or the second riding space is high, wherein the attribute information includes a past riding status of each passenger as to whether each passenger has ridden the vehicle in the preferential space before in a travel route equivalent to the traveling route, and the control method includes determining a number of passengers on each of the first riding space and the second riding space who have not ridden the vehicle in the preferential space before, and the preferential space is identified to be either the first riding space or the second riding space that has a higher degree of preferential treatment, and the degree of preferential treatment of respective space increases as the number of passengers who have not ridden the vehicle in the preferential space before is high on the respective space;

configuring an orientation of the vehicle to be either the forward direction or the backward direction so that, when the vehicle travels on the traveling route, the preferential space is set to the side where the landscape viewed from the vehicle is good; and controlling the vehicle to travel the traveling route with the configured orientation.

6. A non-transitory computer readable medium storing a control program for causing a computer to execute control of a vehicle that is configured to be able to switch between a forward direction and a backward direction and that includes a first riding space and a second riding space, each of which is a riding position on one side and the other side of a right side and a left side with respect to a front-rear direction of the vehicle, respectively, the control program being configured to cause the computer to execute processes comprising:

acquiring a traveling route;

identifying a side where a landscape viewed from the vehicle is good from among the right side and the left side with respect to a traveling direction for the traveling route;

identifying, based on attribute information of each of a passenger riding in the first riding space and a passenger riding in the second riding space, a preferential space in which a degree of preferential treatment of the first riding space or the second riding space is high, wherein the attribute information includes a past riding status of each passenger as to whether each passenger has ridden the vehicle in the preferential space before in a travel route equivalent to the traveling route, and the computer determines a number of passengers on each of the first riding space and the second riding space who have not ridden the vehicle in the preferential space before, and the preferential space is identified to be either the first riding space or the second riding space that has a higher degree of preferential treatment, and the degree of preferential treatment of respective space increases as the number of passengers who have not ridden the vehicle in the preferential space before is high on the respective space;

configuring an orientation of the vehicle to be either the forward direction or the backward direction so that, when the vehicle travels on the traveling route, the preferential space is set to the side where the landscape viewed from the vehicle is good; and controlling the vehicle to travel the traveling route with the configured orientation.

7. The vehicle according to claim 1, wherein the vehicle includes a crew member space on each of a forward end and a rear end of the vehicle so that the crew member space at either the forward end or the rear end is used in accordance with the configured orientation of the vehicle.

* * * * *